(12) United States Patent
Bunker

(10) Patent No.: US 6,953,633 B2
(45) Date of Patent: Oct. 11, 2005

(54) FIBER COOLING OF FUEL CELLS

(75) Inventor: Ronald Scott Bunker, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 267 days.

(21) Appl. No.: 10/212,541

(22) Filed: Aug. 6, 2002

(65) Prior Publication Data

US 2004/0028988 A1 Feb. 12, 2004

(51) Int. Cl.$^7$ ................................................. H01M 8/02
(52) U.S. Cl. ........................................ 429/26; 429/39
(58) Field of Search ............................. 429/26, 34, 38, 429/39

(56) References Cited

U.S. PATENT DOCUMENTS

| | | | |
|---|---|---|---|
| 4,395,468 A | | 7/1983 | Isenberg ....................... 429/31 |
| 4,874,678 A | * | 10/1989 | Reichner .................. 429/34 X |
| 5,906,898 A | | 5/1999 | Pondo .......................... 429/34 |
| 5,935,725 A | | 8/1999 | Dhar et al. ............... 429/38 X |
| 6,060,188 A | * | 5/2000 | Muthuswamy et al. ... 429/34 X |
| 6,202,650 B1 | * | 3/2001 | Kaneki et al. .............. 131/360 |
| 6,656,624 B1 | * | 12/2003 | King ............................ 429/34 |
| 2002/0048700 A1 | * | 4/2002 | Virkar et al. ................. 429/34 |

FOREIGN PATENT DOCUMENTS

DE            10029468 A        4/2001

OTHER PUBLICATIONS

Pending U.S. Appl. No. 10/063,407, filed Apr. 25, 2002 entitled "Improved Fluid Passage for Power Generation Equipment".

* cited by examiner

Primary Examiner—Stephen J. Kalafut
(74) Attorney, Agent, or Firm—Patrick K. Patnode; Christian G. Cabou

(57) ABSTRACT

Fuel cells for example solid oxide fuel cells require cooling to maintain temperature levels and remove thermal energy generated by the fuel cells. The present invention provides a fuel cell assembly comprising at least one fuel cell. The fuel cell comprises an anode, a cathode, an electrolyte interposed therebetween, an interconnect which is in intimate contact with at least one of the anode, the cathode and the electrolyte; at least one fluid flow channel which is disposed within the fuel cell, and at least one fiber which is disposed within the fluid flow channel. The fiber disposed within the fluid flow channel disrupts a fluid flow during travel of the fluid within the fluid flow channel to generate unsteady wakes. These unsteady wakes enhance the local heat transfer characteristics adjacent to at least one fiber. A higher Reynolds number enhances the heat transfer characteristics proportionately. Enhanced heat transfer characteristics increase the ability to remove heat more efficiently and more effectively.

39 Claims, 10 Drawing Sheets

SECTION X-X

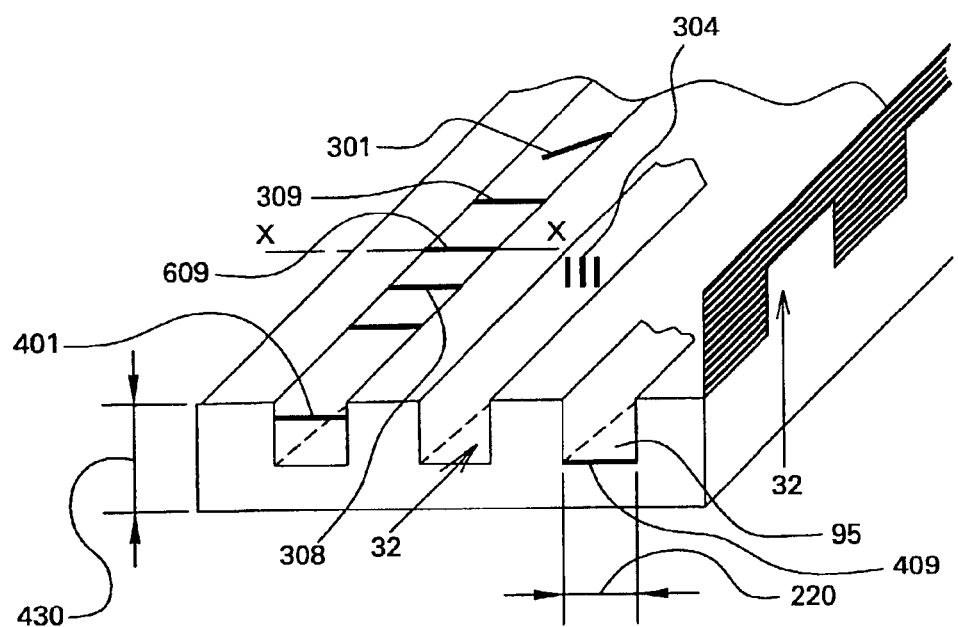
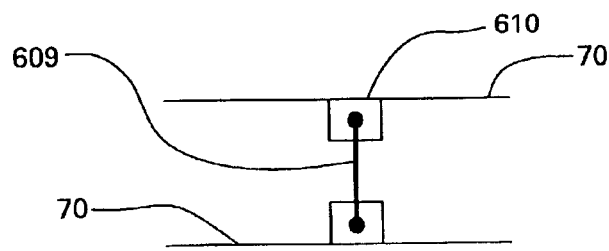
SECTION X-X
FIG.3

FIBER COOLING OF FUEL CELLS

BACKGROUND OF THE INVENTION

The present invention relates generally to power generation equipment such as fuel cells, and particularly to thermal management of fuel cells, for example solid oxide fuel cells.

A fuel cell is an energy conversion device that produces electricity, by electrochemically combining a fuel and an oxidant across an ionic conducting layer. A high temperature fuel cell bundle for example a solid oxide fuel cell bundle is typically constructed of an array of axially elongated tubular shaped connected fuel cells and associated fuel and air distribution equipment. Alternative constructions to the tubular fuel cells are planar fuel cells constructed from flat single members. The planar fuel cells can be of counter-flow, cross-flow and parallel flow varieties. The members of a typical planar fuel cell comprise tri-layer anode/electrolyte/cathode components that conduct current from cell to cell and provide channels for gas flow into a cubic structure or stack.

In a solid oxide fuel cell, the oxygen ion transport ($O^{2-}$) across the electrolyte produces a flow of electrons in an external load. The waste heat generated in a solid oxide fuel cell at its operating temperature from about 600° C. to about 1300° C. is typically removed via an oxidant in order to maintain a desired temperature level of the fuel cell components such as the anode, cathode and electrolyte.

Fuel cells such as solid oxide fuel cells have demonstrated potential for high efficiency and low pollution in power generation, however, there are problems associated with thermal management particularly in the temperature regulation of fuel cell components. Thermal energy generated in a fuel cell from the reaction of a fuel and an oxidant needs to be removed or used internally in order to maintain the operating temperature. Cooling channels in planar fuel cell or cooling tubes in tubular fuel cells use oxidant, typically air, to aid in the transfer or removal of waste heat so as to maintain a stack temperature at or below prescribed limits and maintain a predetermined thermal gradient. Such channels or cooling tubes, as used in conventional fuel cell applications have low convective thermal transfer coefficient between the fluid flow channel and the oxidant. Accordingly there is a need in the art to address improved cooling requirements of fuel cell with improved heat transfer characteristics.

BRIEF DESCRIPTION OF THE INVENTION

One embodiment of the present invention provides a fuel cell assembly comprising at least one fuel cell. The fuel cell comprises an anode, a cathode, an electrolyte interposed therebetween, an interconnect in intimate contact with at least one of the anode, the cathode and the electrolyte, at least one fluid flow channel disposed within the fuel cell, and at least one fiber disposed within the fluid flow channel. The fiber disposed within the fluid flow channel disrupts a fluid flow during travel of the fluid within the fluid flow channel and improves the overall heat transfer effectiveness within the fuel cell.

Another embodiment of the invention provides a fluid flow channel for a fuel cell assembly. The fluid flow channel comprises a housing that defines at least one flow path for a fluid flow. The housing comprises a pair of opposing side portions, and a connecting portion joining the pair of opposing side portions, and at least one fiber, disposed within the housing. The fiber is directly or indirectly attached to at least one of the side portions and the connecting portion of the housing. The fiber disrupts fluid flow during travel of the fluid within the housing.

Still another embodiment of the invention describes a method for making a fuel cell assembly. The method comprises providing at least one anode, providing at least one cathode; providing at least one electrolyte, providing at least one interconnect; providing at least one fluid flow channel, providing fluid flow through the fluid flow channel, and disposing at least one fiber within the fluid flow channel.

These and other features, aspects, and advantages of the present invention will become better understood with reference to the following description, appended claims, and accompanying drawings.

BRIEF DESCRIPTION OF THE DRAWINGS

FIG. 3 is an exemplary arrangement of fibers in a planar fuel cell according to one embodiment of the invention.

DETAILED DESCRIPTION OF THE INVENTION

Figure 1:
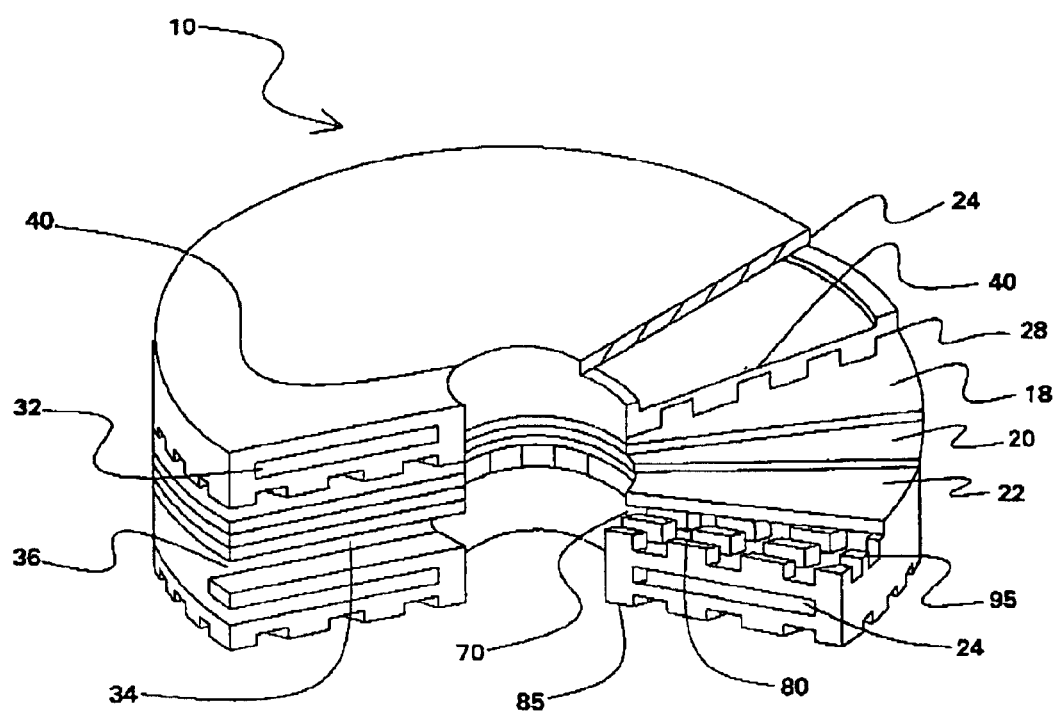
FIG. 1 is a perspective view of a planar fuel cell stack.
Figure 2:
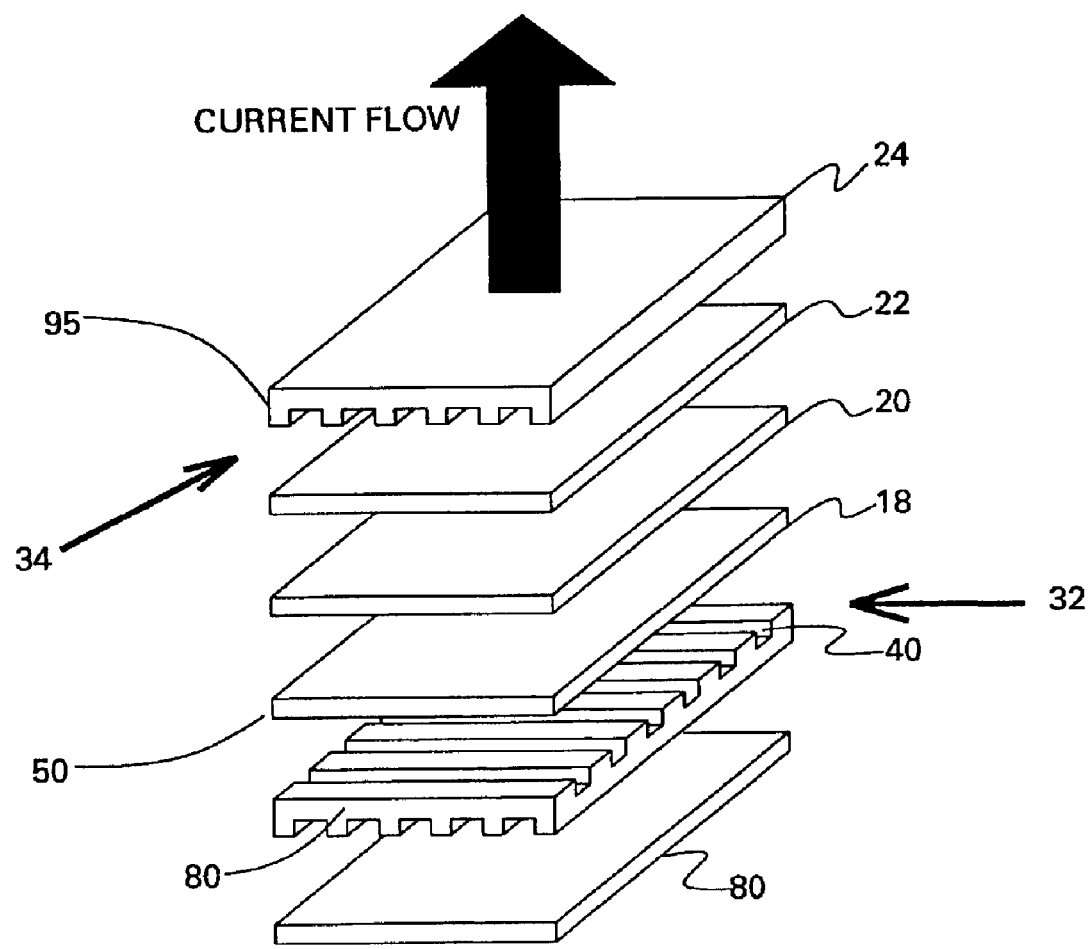
FIG. 2 is a perspective exploded view of a single unit of a planar fuel cell stack.

The present invention provides a fuel cell assembly 10, for example a solid oxide fuel cell (hereinafter "SOFC") assembly, which is an array bundle or stack of fuel cells comprising at least one fuel cell 50. Each fuel cell 50 is a repeat cell unit 50 capable of being stacked together either in series or in parallel or both to build a fuel cell stack system or architecture, capable of producing a resultant electrical energy output. Referring to FIG. 1 and FIG. 2, at least one fuel cell 50 comprises an anode 22, a cathode 18, an electrolyte 20 interposed therebetween, an interconnect 24 which is in intimate contact with at least one of the anode 22, the cathode 18 and the electrolyte 20, at least one fluid flow channel 95 and at least one fiber 40 disposed within at least one fluid flow channel 95. The at least one fluid flow channel 95 typically comprises at least one oxidant flow channel 28 and at least one fuel flow channel 36 disposed within the fuel cell 50. At least one fiber 40 is disposed within at least one of the oxidant flow channel 28 and the fuel flow channel 36. These fibers disrupt the oxidant flow, traveling through the oxidant flow channel 28, and the fuel flow, traveling through the fuel flow channel 36 respectively.

The fuel cell 50 can be any type of fuel cell, that requires flow channels including, but not limited to, solid oxide fuel cells, proton exchange membrane or solid polymer fuel cells, molten carbonate fuel cells, phosphoric acid fuel cells, alkaline fuel cells, direct methanol fuel cells, regenerative fuel cells, zinc air fuel cells, or protonic ceramic fuel cells.

Figure 9:
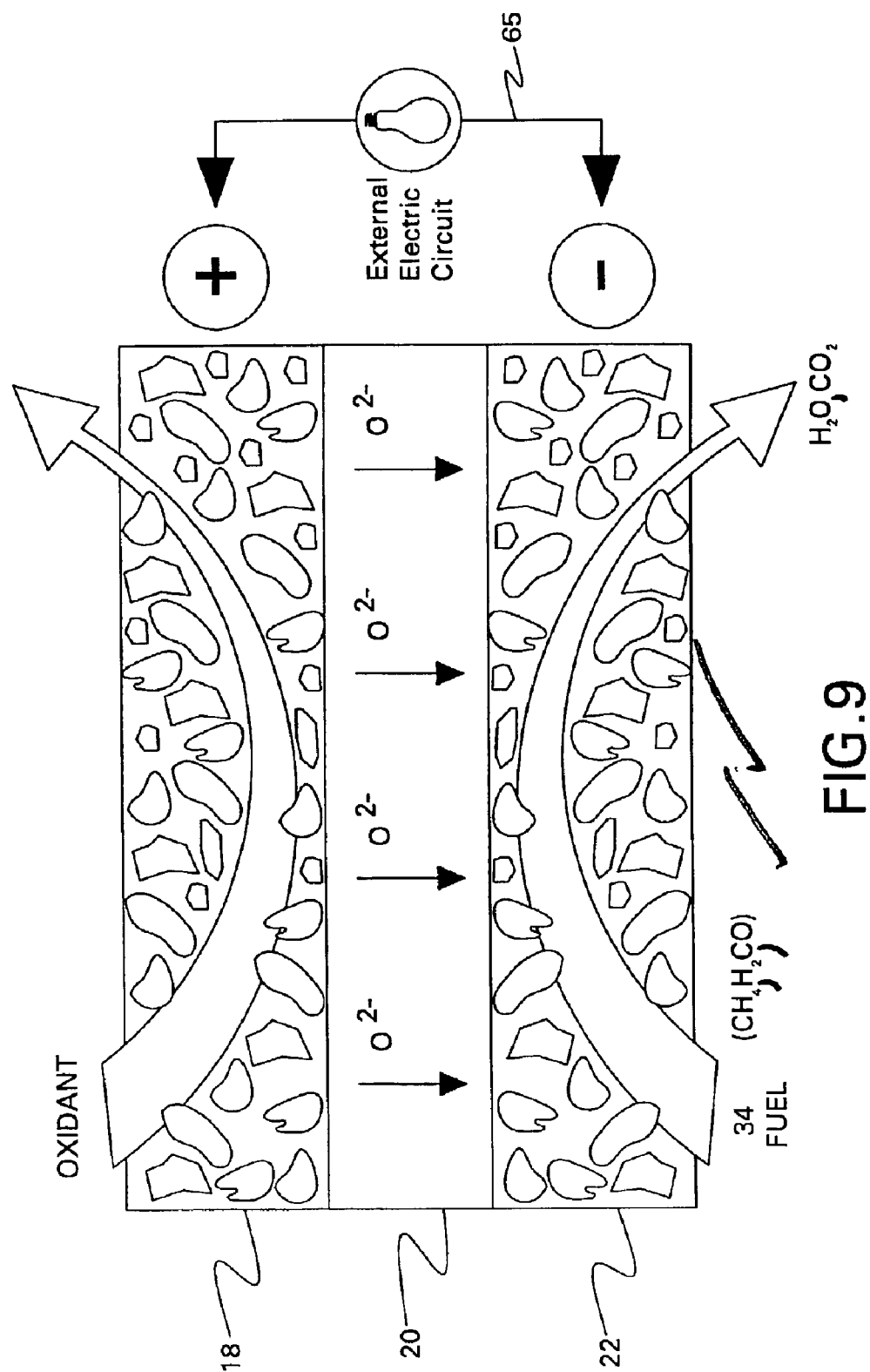
FIG. 9 is a schematic view of producing electrical energy in an exemplary fuel cell.

As illustrated in FIG. 9, the oxidant 32, for example air, is fed to the cathode 18. Oxygen ions ($O^{2-}$) generated at the cathode 18 are transported across the electrolyte 20 interposed between the anode 22 and the cathode 18. A fuel 34, for example natural gas, is fed to the anode. The fuel 34 at the anode site reacts with oxygen ions ($O^{2-}$) transported to the anode 22 across the electrolyte 20. The oxygen ions ($O^{2-}$) are de-ionized to release electrons to an external electric circuit 65. The electron flow thus produces direct current electricity across the external electric circuit 65. The electricity generation process produces certain exhaust gases and generates waste heat.

The main purpose of the anode 22 is to provide reaction sites for the electrochemical oxidation of a fuel gas introduced into the fuel cell. In addition, the anode material should be stable in the fuel-reducing environment, have adequate electronic conductivity, surface area and catalytic activity for the fuel gas reaction at the fuel cell operating conditions and have sufficient porosity to allow gas transport to the reaction sites. The materials suitable for the anode 22 having these properties, include, but are not limited to metallic nickel, nickel alloy, silver, copper, noble metals such as gold and platinum, cobalt, ruthenium, nickel-yttria-stabilized zirconia cermets (Ni—YSZ cermets), copper-yttria-stabilized zirconia cermets (Cu—YSZ cermets), Ni-Ceria cermets, ceramics or combinations thereof.

The main purpose of the cathode 18 is to provide reaction sites for the electrochemical reduction of the oxidant. Accordingly, the cathode 18 must be stable in the oxidizing environment, have sufficient electronic conductivity, surface area and catalytic activity for the oxidant gas reaction at the fuel cell operating conditions and have sufficient porosity to allow gas transport to the reaction sites. The materials suitable for the cathode 18 having the aforesaid properties, include, but are not limited to perovskite doped lanthanum manganate ($LaMnO_3$), strontium-doped $LaMnO_4$ (SLM), tin doped Indium Oxide ($In_2O_3$), strontium-doped $PrMnO_3$, $LaFeO_3$—$LaCoO_3$ $RuO_2$-Yttria-stabilized zirconia (YSZ), lanthanum cobaltite, and combinations thereof.

The anode 22 and the cathode 18 typically have a surface area sufficient to support electrochemical reactions. The materials used for the anode 22 and the cathode 18, are thermally stable between the typical minimum and maximum operating temperature of the fuel cell assembly 10, for example between about 600° C. to about 1300° C.

The main purpose of electrolyte 20 disposed between the anode 22 and the cathode 18 is to transport oxygen ions ($O^{2-}$) between the cathode 18 and the anode 22. In addition to the above, the electrolyte 20 separates the fuel from the oxidant in the fuel cell 50. Accordingly, the electrolyte 20 must be stable in both the reducing and oxidizing environments, impermeable to the reacting gases and adequately conductive at the operating conditions. The materials suitable for the electrolyte 20 having the aforesaid properties, include, but are not limited to, zirconium oxide, yttria stabilized zirconia (YSZ), doped ceria, cerium oxide ($CeO_2$), bismuth sesquioxide, pyrochlore oxides, doped zirconates, perovskite oxide materials and combinations thereof.

The primary function of the interconnect 24 is to electrically connect the anode 22 of one repeatable cell unit to the cathode 18 of an adjacent cell unit. In addition, the interconnect 24 should provide uniform current distribution, should be impermeable to gases, stable in both reducing and oxidizing environments, and adequately conductive to support electron flow at a variety of temperatures. The materials suitable for the interconnect 24 having the aforesaid properties, include, but are not limited to, chromium based ferritic stainless steel, cobaltite, ceramic, lanthanum chromate ($LaCrO_3$), cobalt dichromate ($CoCr_2O_4$), Inconel 600, Inconel 601, Hastelloy X, Hastelloy-230, Ducrolloy, Kovar, Ebrite and combinations thereof.

One embodiment of the invention as illustrated in FIG. 1 and FIG. 2 provides a fluid flow channel 95 defined by a housing 85. The housing 85 defines at least one flow channel 95 for fluid flow therethrough. The housing 85 comprises a pair of opposing side portions 70, and a connecting portion 80 joining the pair of opposing side portions 70 and at least one fiber 40, disposed within the housing (see FIG. 2). The fibers 40 are either directly or indirectly attached to one of the side portions 70 and the connecting portion 80 of the housing. The cross sectional shape of the fluid flow channel 95 can be selected from the group which includes, but is not limited to, a square, a rectangle, a circle, or a contour. Selection of the cross sectional shape of the fluid flow channel depends on factors such as manufacturing feasibility (see FIG. 3 and FIG. 4).

According to one embodiment, at least one fiber 40 is disposed within the oxidant flow channel 28, while in another embodiment, at least one fiber 40 is disposed within the fuel flow channel 36. The fibers 40, as disposed therein disrupt oxidant flow 32 during travel inside the oxidant flow channel 28, and also disrupt fuel flow 34 during travel inside the fuel flow channel 36 (see FIGS. 1, 2, 3 and 4). The oxidant flow 32 inside the oxidant flow channel 28 as well as the fuel flow 34 inside the fuel flow channel 36 is either laminar or transitional having low Reynolds number characteristics.

Figure 8:
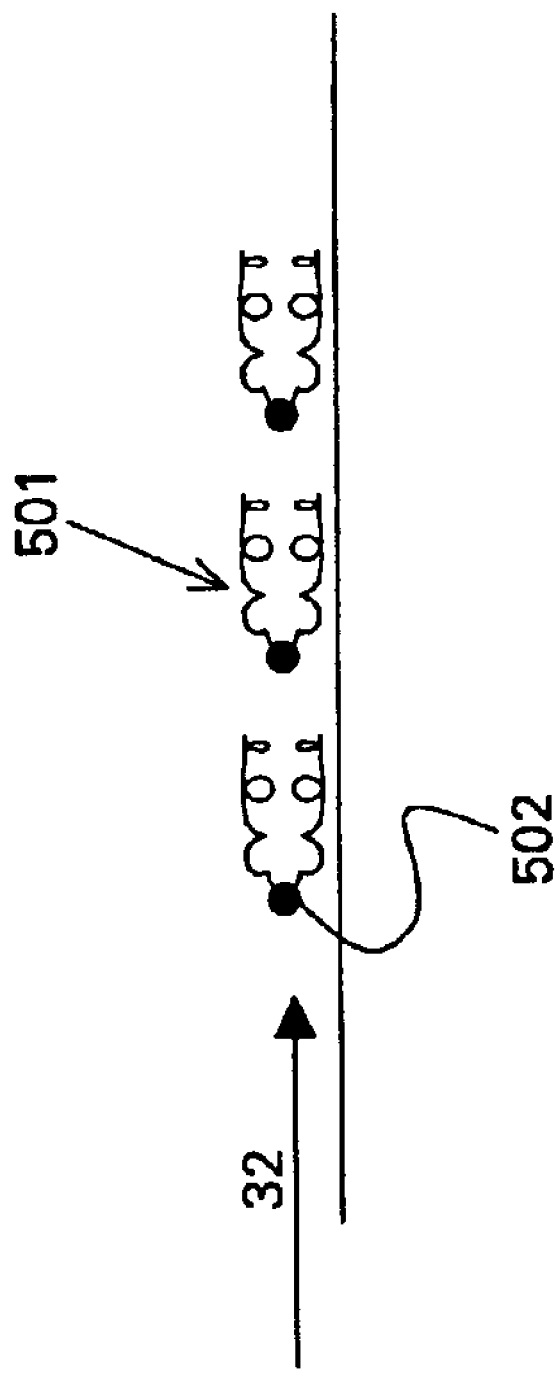
FIG. 8 is a schematic view of heat transfer mechanism of the fibers in an exemplary fuel cell arrangement.
Figure 10:
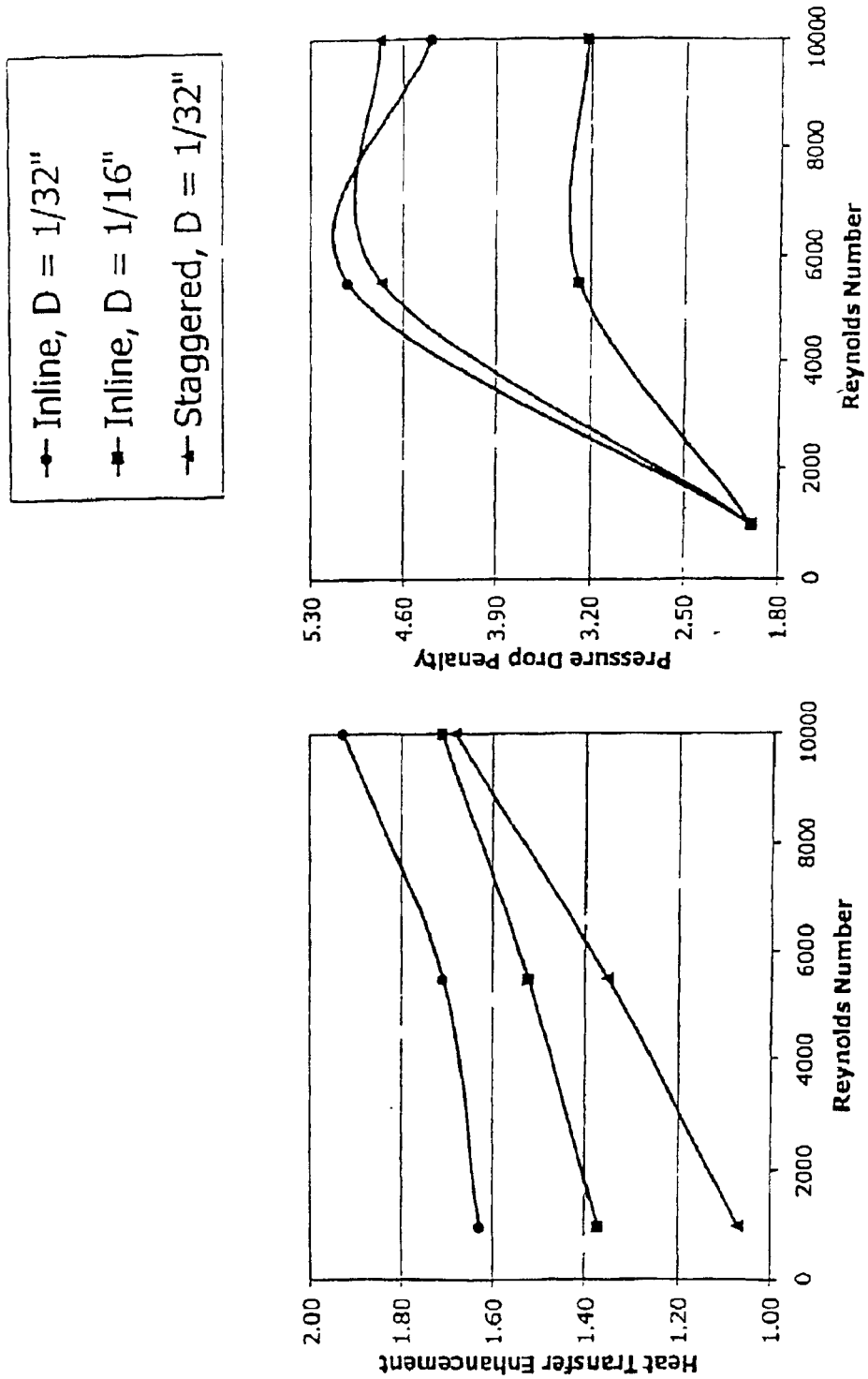
FIG. 10 is a plot of heat transfer characteristics of fibers in an exemplary fuel cell.

As illustrated in FIG. 10, heat transfer characteristics at low Reynolds number are lower than the heat transfer characteristics at higher Reynolds number. As illustrated in FIG. 8, the fibers 502 while disrupting the fluid flow creates unsteady wakes 501 behind each fiber 502. These unsteady wakes 501 enhance the local heat transfer characteristics adjacent to each respective fiber 502. A higher Reynolds number enhances the heat transfer characteristics proportionately. Enhanced heat transfer characteristics increase the ability to remove heat more efficiently and more effectively. The enhanced heat transfer characteristics thus improve cooling ability and enable the maintenance of predetermined thermal gradients and temperature levels across the fuel cell assembly 10.

In one embodiment of the invention, at least one fiber 40 is exposed to a high temperature gaseous fuel flow 34 wherein temperature ranges from at or near room temperature to about 1300° C. In accordance with the aforesaid embodiment, the fiber 40 must withstand the high temperature and accordingly the fiber 40 comprises a high temperature resistant material. The materials suitable for the fiber 40 having aforesaid properties include, but are not limited to, chromium based ferritic stainless steel, cobaltite, ceramic, lanthanum chromate ($LaCrO_3$), cobalt dichromate ($CoCr_2O_4$), Inconel 600, Inconel 601, Hastelloy X, Hastelloy-230, Ducrolloy, Kovar, Ebrite and combinations thereof.

In another embodiment of the invention, at least one fiber 40 is exposed to an oxidant for example air. Therefore, in accordance with the present embodiment, the fiber 40 comprises materials, which are typically oxidation resistant or passive to oxidation in an oxidizing environment. Such materials, which are passive to oxidation, either form a protective scale on the base metal when exposed to the oxidizing environment or are chosen in order to prevent the formation of a scale due to high oxidation resistance. The materials thus suitable for the fiber 40 having aforesaid properties include, but are not limited to, chromium based ferritic stainless steel, cobaltite, ceramic, lanthanum chromate ($LaCrO_3$), cobalt dichromate ($CoCr_2O_4$), Inconel 600, Inconel 601, Hastelloy X, Hastelloy-230, Ducrolloy, Kovar, Ebrite and combinations thereof.

Figure 4:
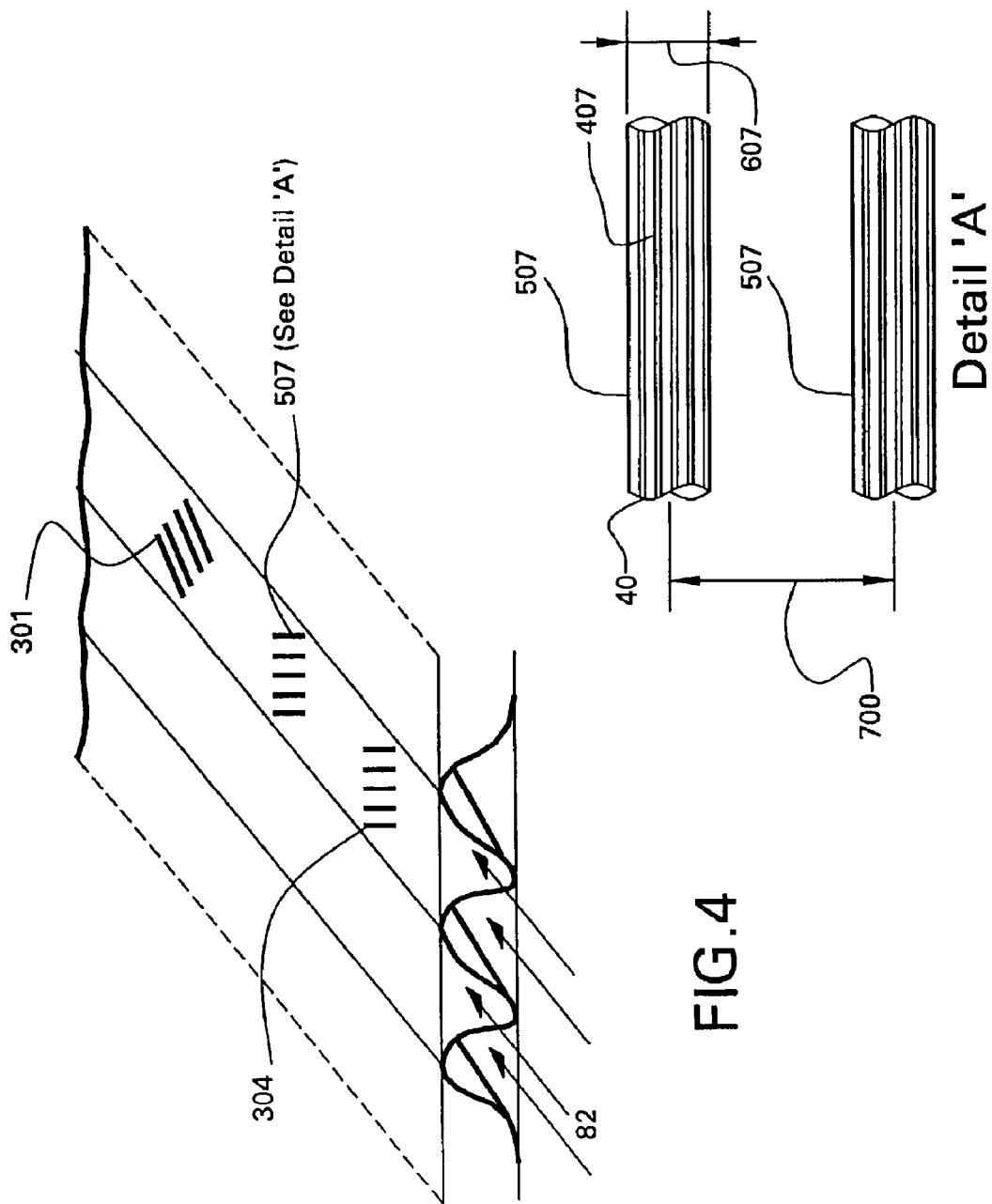
FIG. 4 is another exemplary arrangement of fibers in a planar fuel cell according to one embodiment of the invention.

In another embodiment, at least one fiber has a thickness ranging from about 5 percent to about 20 percent of a width 220 of the fluid flow channel 95 (see FIG. 3 and FIG. 4). The choice of fiber thickness ensures mechanical stability and determines the region of influence for the unsteady wakes 501 generated by the fibers, when exposed to a stream of either oxidant flow 32 or fuel flow 34. In another embodiment, at least one fiber 40 has a substantially constant cross sectional area ensuring uniform heat transfer characteristics throughout the fiber. In accordance with the aforesaid embodiment, at least one fiber 40 has a cross-sectional shape selected from the group consisting of but not limited to square, rectangle, circle, ellipse, and annulus depending on factors, such as manufacturing feasibility While FIG. 3 represents an exemplary arrangement at fibers in a planar fuel cell according to one embodiment of the invention. FIG. 4 represents another exemplary arrangement of fibers in a planar fuel cell according to another embodiment of the invention. In one embodiment, at least one fiber comprises a plurality of fibers 407 packed in a bundle 507 (see FIG. 4). In an exemplary arrangement, any two adjacent bundles 507 are located away from each other by a distance 700 of at least about five times to about forty times of a diameter 607 of the bundle 507. According to another embodiment, any two adjacent bundles 507 are located away from each other by a distance 700 of at least about five times to about fifty times of a diameter 607 of the bundle 507. The arrows 82, as illustrated in FIG. 4 represent flow of the oxidant or fuel.

In accordance with another embodiment, at least one fiber 308 is attached with one end connected to a surface of the fluid flow channel. In one embodiment, at least one fiber 309 is attached with both ends connected to the surface of at least one fluid flow channel (See FIG. 3 and FIG. 4). In another embodiment, at least one fiber 609 is secured within an insert 610 configured with both ends connected to a surface of at least one fluid flow channel (see FIG. 3). Securing fibers 609 within an insert 610 ensures quick replacement of the fibers 609 in case they are damaged. Ability to replace fibers 609 quickly minimizes downtime of fuel cell 50 and enhances availability of the fuel cell 50.

In accordance with another embodiment, at least one fiber 304 is oriented, perpendicularly to the direction of flow. In another embodiment, at least one fiber 301 is oriented angularly to the direction of the fluid flow (see FIG. 3).

In another embodiment, at least one fiber 401 is oriented parallel to a surface of at least one fluid flow channel 95. According to one embodiment, the fiber 401 is located away from the surface by a distance 430 of at least about one times to about five times of a diameter of the fiber. According to another embodiment, the fiber 401 is located away from the surface by a distance 430 of at least about one times to about ten times of a diameter of the fiber. Yet in certain other embodiment, at least one fiber 410 is oriented perpendicular to a surface of at least one fluid flow channel. According to the aforesaid embodiment, the fibers 410 are in proximal contact with the surface perpendicular to the surface of the fluid flow channel 95. In some other embodiment, at least one fiber 409 is oriented angularly to a surface of at least one fluid flow channel 95 (see FIG. 3 and FIG. 4).

Orientation of fibers with the direction of fluid flow as well as with the surface of the fluid flow channel, and spacing between the fibers 40 and the distance between any two adjacent bundle of fibers 507, are chosen in such a fashion such that the density and thermal capacity of the fibers are tailored to control thermal gradient across the fuel cell assembly 50 without significant increase of the resistance to the fluid flow offered by the fibers 40 and the bundle of fibers 507.

Figure 5:
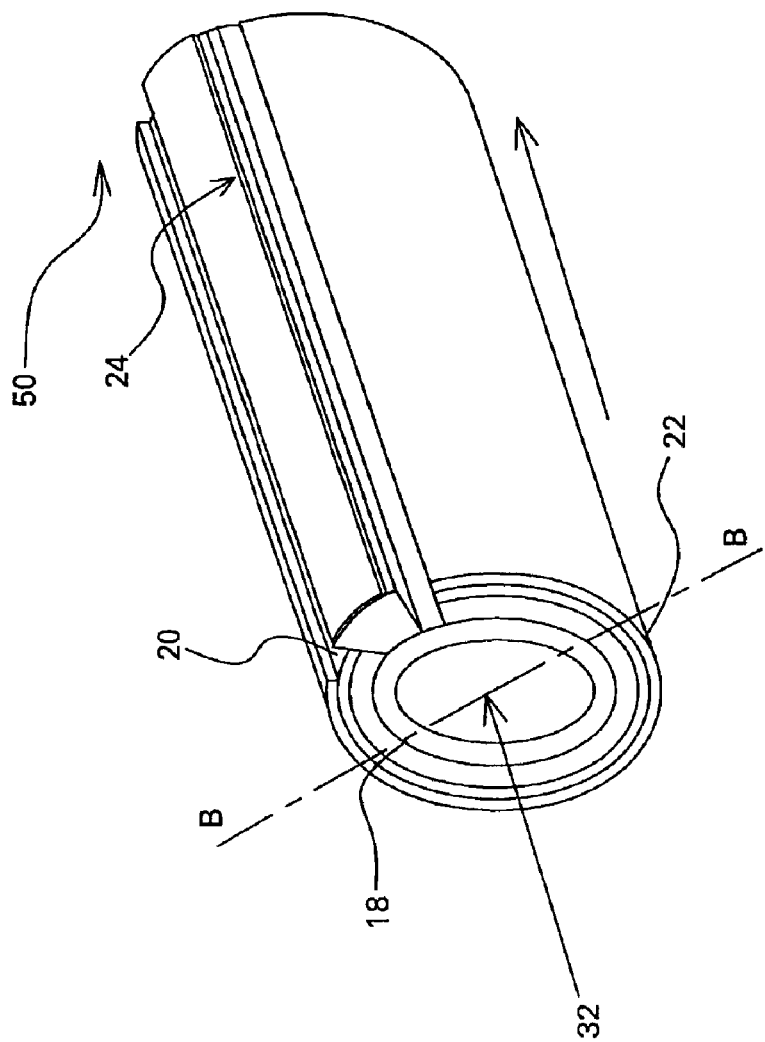
FIG. 5 is a perspective view of a single cell unit of a tubular fuel cell stack.
Figure 6:
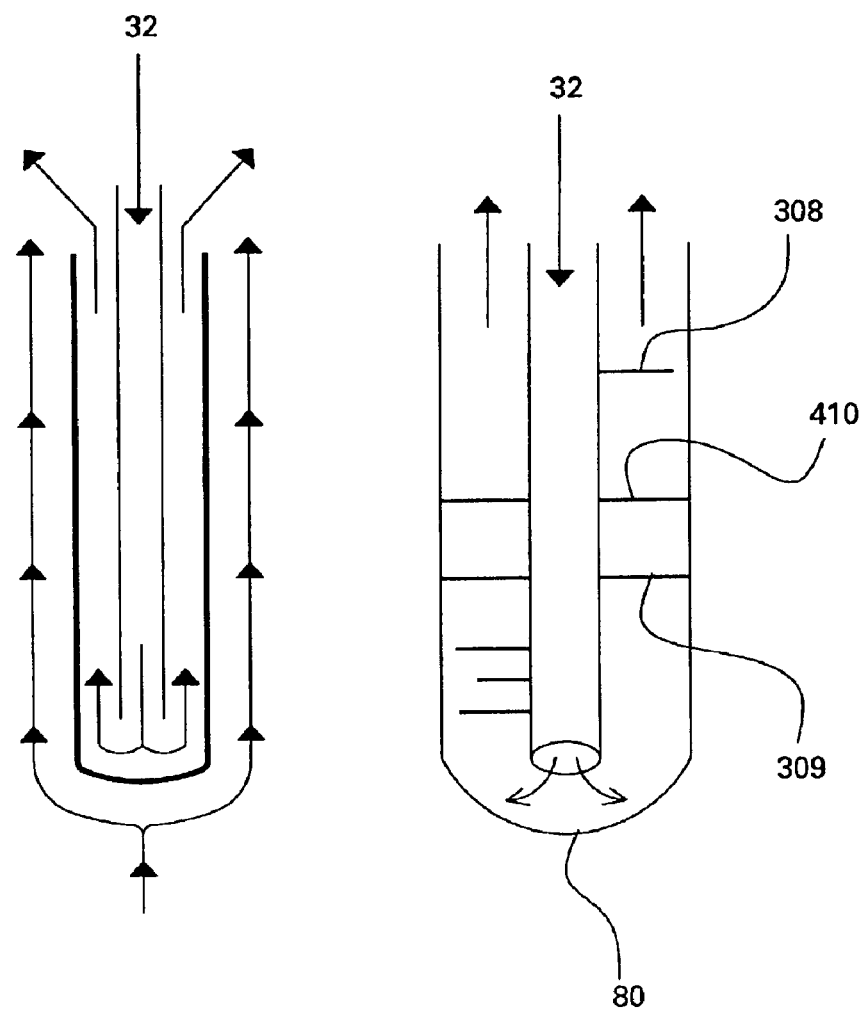
FIG. 6 is a sectional view of the single cell unit of a tubular fuel cell as shown in FIG. 5 across section B—B.
Figure 7:
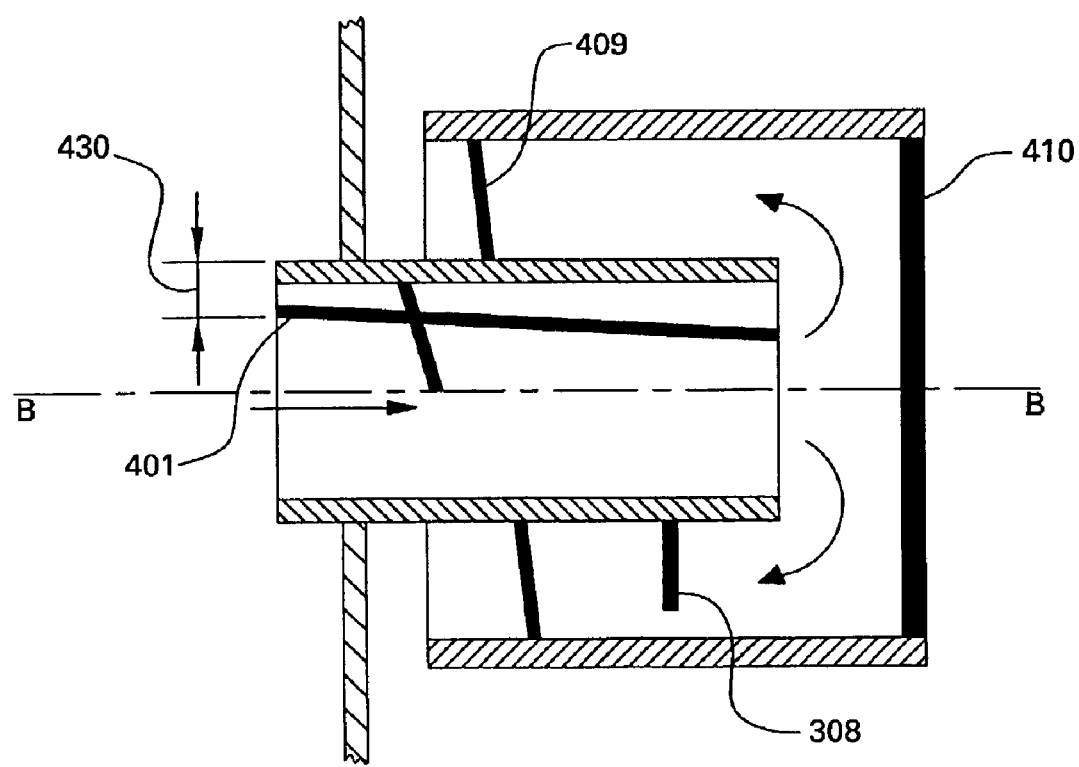
FIG. 7 is an exemplary arrangement of fibers according to one embodiment of the invention for a tubular fuel cell.

While the present invention is discussed in terms of application to planar fuel cells as illustrated in FIG. 1 through FIG. 4, it is recognized that such invention can be utilized in other embodiments of fuel cells including but not limited to tubular fuel cells. FIG. 5 represents a perspective view of a single cell unit of a tubular fuel cell bundle. FIG. 6 and FIG. 7 represents some exemplary arrangement of fibers according to one embodiment of the invention for a tubular fuel cell.

Another embodiment of the invention provides a method for making a fuel cell assembly. The method comprises providing at least one anode 22, providing at least one cathode 18, providing at least one electrolyte 20, providing at least one interconnect 24, providing at least one fluid flow channel, providing fluid flow through the fluid flow channel and disposing at least one fiber 40 within the fluid flow channel. The fluid flow inside the fluid flow channel is either laminar or transitional having low Reynolds number characteristics. Heat transfer characteristics at low Reynolds number are lower than the heat transfer characteristics at higher Reynolds number, which has been illustrated in FIG. 9. Disposing at least one fiber in the fluid flow channel generates unsteady wakes 501 behind each fiber 502 as illustrated in FIG. 8. These unsteady wakes 501 enhance the local heat transfer characteristics adjacent to the at least one fiber. A higher Reynolds number enhances the heat transfer characteristics proportionately. Enhanced heat transfer characteristics increase the ability to remove heat more efficiently and more effectively. The enhanced heat transfer characteristics thus improve cooling ability and enable the maintenance of predetermined thermal gradients and temperature levels across the fuel cell assembly 10.

The invention has been illustrated with some exemplary embodiments as described above. However the invention is not necessarily intended to be limited to the embodiments described herein, since various modifications and substitutions can be made without departing in any way from the spirit of the present invention. As such, further modifications and equivalents of the invention herein disclosed can occur to persons skilled in the art using no more than routine experimentation, and all such modifications and equivalents are believed to be within the spirit and scope of the invention as defined by the appended claims.

What is claimed is:

1. A fuel cell assembly comprising:
   at least one fuel cell comprising an anode, a cathode, and an electrolyte interposed there between;
   an interconnect in intimate contact with at least one of said anode, said cathode and said electrolyte;
   at least one fluid flow channel disposed within said at least one fuel cell; and
   at least one fiber disposed within said at least one fluid flow channel to disrupt a fluid flow during travel of said fluid flow within said at least one fluid flow channel;

wherein said at least one fiber has a substantially constant cross sectional area and is configured to enhance local heat transfer rates to maintain a predetermined thermal gradient in said fuel cell assembly.

2. A fuel cell assembly in accordance with claim 1, wherein said fuel cell is selected from the group consisting of solid oxide fuel cells, proton exchange membrane or solid polymer fuel cells, molten carbonate fuel cells, phosphoric acid fuel cells, alkaline fuel cells, direct methanol fuel cells, regenerative fuel cells, zinc air fuel cells, and protonic ceramic fuel cells.

3. A fuel cell assembly in accordance with claim 1, wherein said at least one fuel cell comprises at least one of a planar fuel cell and a tubular fuel cell.

4. A fuel cell assembly in accordance with claim 1, wherein said at least one fluid flow channel comprises an oxidant flow channel and said at least one fiber is disposed within said oxidant flow channel to disrupt an oxidant flow during travel within said oxidant flow channel.

5. A fuel cell assembly in accordance with claim 1, wherein said at least one fluid flow channel comprises a fuel flow channel and said at least one fiber is disposed within said fuel flow channel to disrupt a fuel flow during travel within said fuel flow channel.

6. A fuel cell assembly in accordance with claim 1, wherein said at least one fluid flow channel comprises an oxidant flow channel and a fuel flow channel and said at least one fiber is disposed within at least one of said oxidant flow channel and said fuel flow channel.

7. A fuel cell assembly in accordance with claim 1, wherein said at least one fiber comprises a high temperature resistant material.

8. A fuel cell assembly in accordance with claim 7, wherein said high temperature resistant material is selected from the group consisting of chromium based ferritic stainless steel, cobaltite, ceramic, lanthanum chromate ($LaCrO_3$), cobalt dichromate ($CoCr_2O_4$) and combinations thereof.

9. A fuel cell assembly in accordance with claim 1, wherein said at least one fiber comprises an oxidation resistant material.

10. A fuel cell assembly in accordance with claim 9, wherein said oxidation resistant material is selected from the group consisting of chromium based ferritic stainless steel, cobaltite, ceramic, lanthanum chromate ($LaCrO_3$), cobalt dichromate ($CoCr_2O_4$) and combinations thereof.

11. A fuel cell assembly in accordance with claim 1, wherein said at least one fiber has a thickness ranging from about 5 percent to about 20 percent of a width of the fluid flow channel.

12. A fuel cell assembly in accordance with claim 1, wherein said at least one fiber has a cross-sectional shape selected from the group consisting of square, rectangle, circle, ellipse, and annulus.

13. A fuel cell assembly in accordance with claim 1, wherein said at least one fiber comprises a plurality of fibers packed in a bundle.

14. A fuel cell assembly in accordance with claim 1, wherein said at least one fiber is oriented perpendicularly to a direction of said fluid flow.

15. A fuel cell assembly in accordance with claim 1, wherein said at least one fiber is oriented angularly to a direction of said fluid flow.

16. A fuel cell assembly in accordance with claim 1, wherein said at least one fiber is attached with one end connected to a surface of said at least one fluid flow channel.

17. A fuel cell assembly in accordance with claim 1, wherein said at least one fiber is attached with both ends connected to a surface of said at least one fluid flow channel.

18. A fuel cell assembly in accordance with claim 1, wherein said at least one fiber is secured within an insert configured with both ends connected to a surface of said at least one fluid flow channel.

19. A fuel cell assembly in accordance with claim 1, wherein said at least one fiber is oriented parallel to a surface of said at least one fluid flow channel.

20. A fuel cell assembly in accordance with claim 19, wherein said at least one fiber is located away from the surface by a distance of at least about one times to about five times of a diameter of the fiber.

21. A fuel cell assembly in accordance with claim 20, wherein said at least one fiber is located away from the surface by a distance of at least about one times to about ten times of a diameter of the fiber.

22. A fuel cell assembly in accordance with claim 13, wherein said at least one fiber comprises a plurality of fibers packed in a bundle, wherein any two adjacent bundles are located away from each other by a distance of at least about five times to about forty times of a diameter of the bundle.

23. A fuel cell assembly in accordance with claim 22, wherein said at least one fiber comprises a plurality of fibers packed in a bundle, wherein any two adjacent bundles are located away from each other by a distance of at least about five times to about fifty times of a diameter of the bundle.

24. A fuel cell assembly in accordance with claim 1, wherein said at least one fiber is disposed in proximal contact with a surface which is perpendicular to a surface of said at least one fluid flow channel.

25. A fuel cell assembly in accordance with claim 1, wherein said at least one fiber is oriented angularly to a surface of said at least one fluid flow channel.

26. A fluid flow channel for a fuel cell assembly, said fluid flow channel comprising:
    a housing defining at least one flow path for a fluid flow, said housing comprising a pair of opposing side portions, and a connecting portion joining said pair of opposing side portions; and
    at least one fiber disposed within said housing directly or indirectly attached to at least one of said side portions and said connecting portion to disrupt a fluid flow during travel of said fluid flow within said housing;
    wherein said at least one fiber has a substantially constant cross sectional area and is configured to enhance local heat transfer rates to maintain a predetermined thermal gradient in cell assembly.

27. A fluid flow channel for a fuel cell assembly in accordance with claim 26, wherein said fluid flow channel comprises an oxidant flow channel and said at least one fiber is disposed within said oxidant flow channel to disrupt an oxidant flow during travel within said oxidant flow channel.

28. A fluid flow channel for a fuel cell assembly in accordance with claim 26, wherein said fluid flow channel comprises a fuel flow channel and said at least one fiber is disposed within, said fuel flow channel to disrupt a fuel flow during travel within said fuel flow channel.

29. A fluid flow channel for a fuel cell assembly in accordance with claim 26, wherein said fluid flow channel comprises at least one of an oxidant flow channel and a fuel flow channel and said at least one fiber is disposed within said at least one of an oxidant flow channel and a fuel flow channel.

30. A fluid flow channel for a fuel cell assembly in accordance with claim 26, wherein said at least one fiber comprises a high temperature resistant material.

31. A fluid flow channel for a fuel cell assembly in accordance with claim 30, wherein said high temperature resistant material is selected from the group consisting of chromium based ferritic stainless steel, cobaltite, ceramic, lanthanum chromate (LaCrO$_3$), cobalt dichromate (CoCr$_2$O$_4$) and combinations thereof.

32. A fluid flow channel for a fuel cell assembly in accordance with claim 26, wherein said at least one fiber comprises an oxidation resistant material.

33. A fluid flow channel for a fuel cell assembly in accordance with claim 32, wherein said oxidation resistant material is selected from the group consisting of chromium based ferritic stainless steel, cobaltite, ceramic, lanthanum chromate (LaCrO$_3$), cobalt dichromate (CoCr$_2$O$_4$) and combinations thereof.

34. A fluid flow, channel for a fuel cell assembly, said fluid flow channel comprising:
   a tubular housing defining at least one flow path for a fluid flow; and
   at least one fiber disposed within said tubular housing, said at least one fiber having at least one end directly or indirectly attached to said tubular housing, to disrupt a fluid flow during travel of said fluid flow within said tubular housing;
   wherein said at least one fiber has a substantially constant cross sectional area and is configured to enhance local heat transfer rates to maintain a predetermined thermal gradient in said cell assembly.

35. A fluid flow channel for a fuel cell assembly in accordance with claim 34, wherein said fluid flow channel comprises at least one of an oxidant flow channel and a fuel flow channel and said at least one fiber is disposed within said at least one of an oxidant flow channel and a fuel flow channel.

36. A fluid flow channel for a fuel cell assembly in accordance with claim 34, wherein said at least one fiber comprises a high temperature resistant material.

37. A fluid flow channel for a fuel cell assembly in accordance with claim 36, wherein said high temperature resistant material is selected from the group consisting of chromium based ferritic stainless steel, cobaltite, ceramic, lanthanum chromate (LaCrO$_3$), cobalt dichromate (CoCr$_2$O$_4$) and combinations thereof.

38. A fuel cell assembly comprising:
   at least one fuel cell comprising an anode, a cathode, and an electrolyte interposed therebetween;
   an interconnect in intimate contact with at least one of said anode, said cathode and said electrolyte;
   at least one oxidant flow channel disposed within said at least one fuel cell;
   at least one fuel flow channel disposed within said at least one fuel cell; and
   at least one fiber disposed within at least one of said oxidant flow channel and said fuel flow channel for disrupting a fluid flow during travel therein;
   wherein said at least one fiber has a substantially constant cross sectional area and is configured to enhance local heat transfer rates to maintain a predetermined thermal gradient in said fuel cell assembly.

39. A fuel cell assembly in accordance with claim 38, wherein said fuel cell is selected from the group consisting of solid oxide fuel cells, proton exchange membrane or solid polymer fuel cells, molten carbonate fuel cells, phosphoric acid fuel cells, alkaline fuel cells, direct methanol fuel cells, regenerative fuel cells, zinc air fuel cells, and protonic ceramic fuel cells.

* * * * *